Feb. 28, 1956
H. E. CHAPLIN
2,736,523
SECTIONAL FUSELAGE FOR AIRCRAFT
Filed Dec. 30, 1952
3 Sheets-Sheet 1
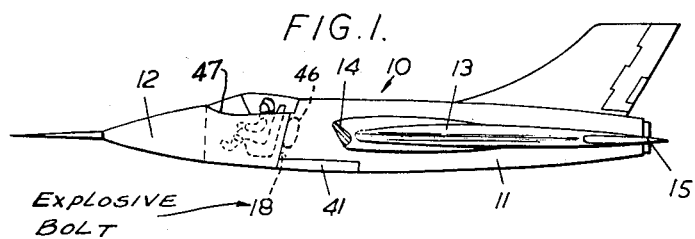
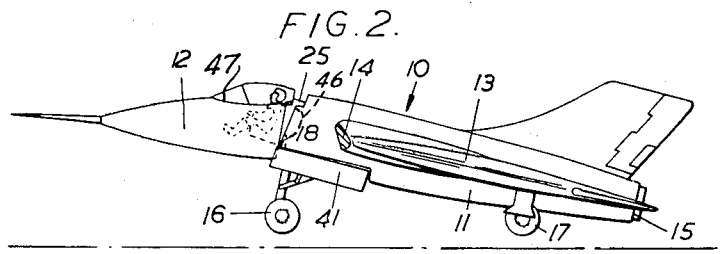
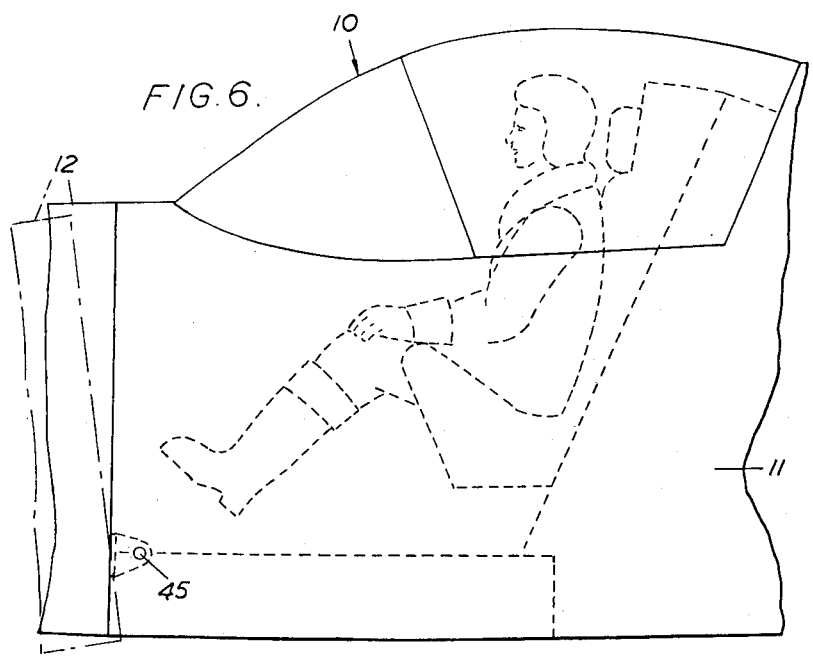
Inventor
HERBERT E. CHAPLIN
By Watson, Cole, Grindle
 & Watson
Attorneys Feb. 28, 1956     H. E. CHAPLIN     2,736,523
SECTIONAL FUSELAGE FOR AIRCRAFT
Filed Dec. 30, 1952     3 Sheets-Sheet 2
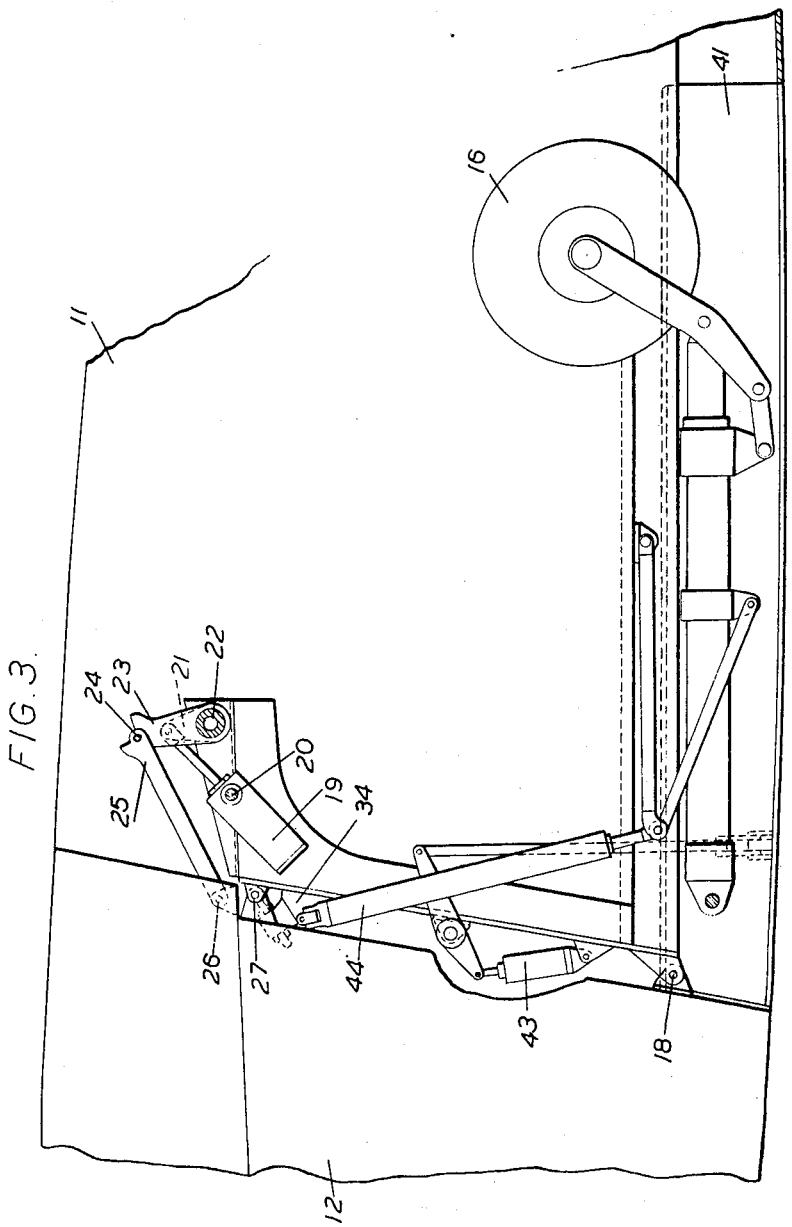
*Inventor*
HERBERT E. CHAPLIN
By Watson, Cole,
Grindle & Watson
*Attorneys*

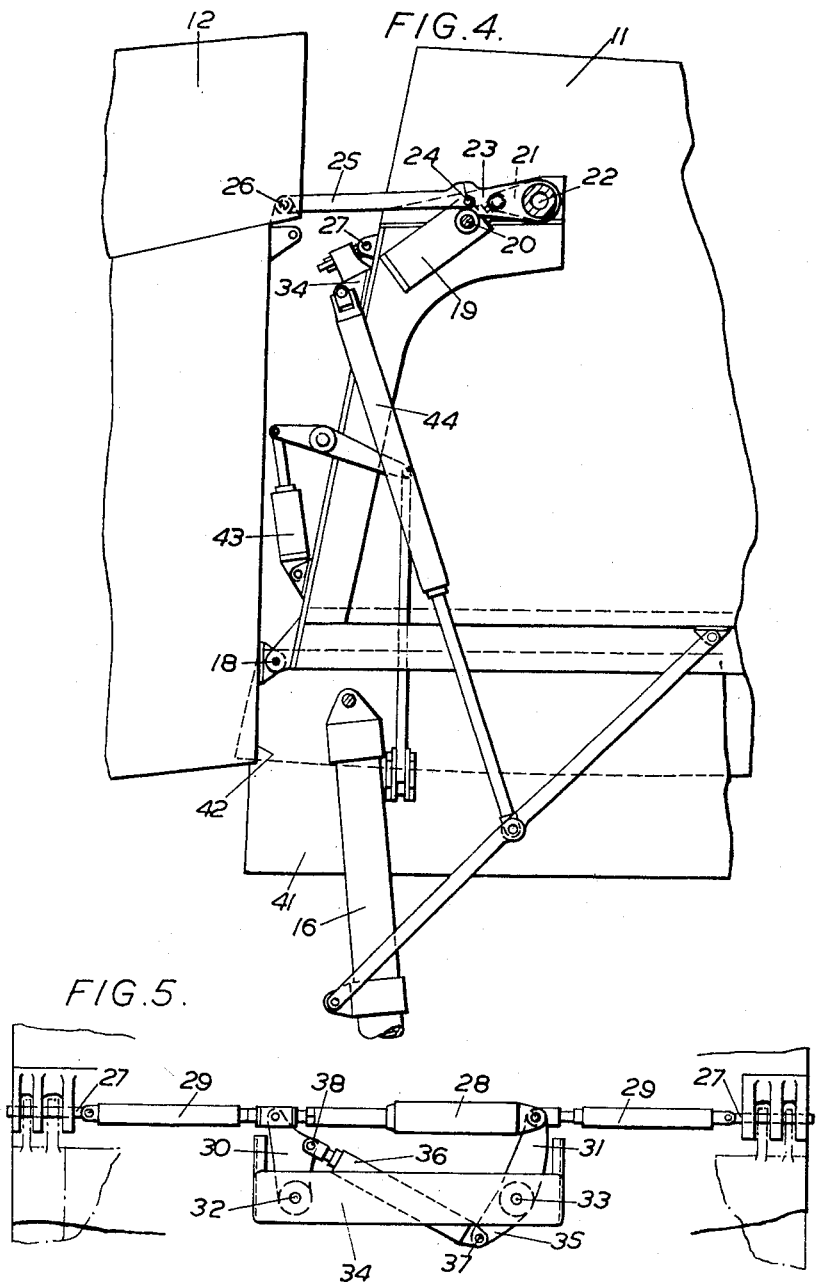

United States Patent Office 2,736,523
Patented Feb. 28, 1956

2,736,523
SECTIONAL FUSELAGE FOR AIRCRAFT

Herbert Eugene Chaplin, Hayes, England, assignor to The Fairey Aviation Company Limited, Hayes, England, a company of Great Britain Application December 30, 1952, Serial No. 328,746

Claims priority, application Great Britain January 2, 1952

18 Claims. (Cl. 244—140)

This invention relates to aircraft. Where an aircraft includes a nose portion extending forward in front of a cockpit difficulty is liable to be experienced in providing the pilot or other occupant of the cockpit with a satisfactory view, and especially with a satisfactory view of the ground when taking off or landing. This difficulty is liable to be particularly serious in the case of certain types of high-speed aircraft which take off and land in a nose-up attitude.

According to the present invention an aircraft includes a fuselage formed in two portions, a body portion and a nose portion, a pivotal connection between the portions permitting the nose portion to be inclined relatively to the body portion from its normal-flight position to a drooping-nose position in which the pilot's lowest forward line of vision clear of the aircraft is inclined downwardly at a greater angle in relation to the body portion than in the normal-flight position, and actuating means arranged to move the nose portion from the drooping-nose position to the normal-flight position and to move the nose portion from the normal-flight position to the drooping-nose position.

The aircraft is capable of controlled flight when the nose portion is in the drooping-nose position.

The actuating means for the nose portion may be interconnected with a retractable under-carriage so as to move the nose portion only when the under-carriage is projected.

The aircraft may include a cockpit incorporated in the nose portion to pivot with it. The cockpit may be pressurized and may be capable of being completely disconnected from both the nose portion and the body portion, and provided with a parachute.

The invention may be carried into practice in various ways but two specific embodiments will be briefly described by way of example with reference to the accompanying diagrammatic drawings in which:

Figure 1 is a general diagrammatic side view of an aircraft embodying the invention in the normal-flight position, Figure 2 is a view similar to Figure 1 showing the aircraft in the drooping-nose position, Figure 3 is an enlarged view corresponding to part of Figure 1, Figure 4 is an enlarged view corresponding to part of Figure 2, Figure 5 is a detail view of the locking mechanism for the nose portion, and Figure 6 is a view similar to Figures 1 and 2 of a modified construction.

The invention is shown as applied to a high speed single-seater aircraft of delta-wing type having a fuselage 10 formed in two parts, namely a main body portion 11 and a nose portion 12 which includes the pilot's cockpit. The body portion carries wings 13, the roots of which incorporate air inlets 14 for a jet propulsion unit the exhaust of which is at the rear end 15 of the fuselage. The aircraft is provided with a retractable front under-carriage 16 and a retractable rear under-carriage indicated diagrammatically at 17.

In accordance with the invention the nose portion 12 is connected to the body portion so that it can be inclined downwardly relatively to the body portion from its normal-flight position shown in Figures 1 and 3 to a drooping-nose position shown in Figures 2 and 4. Thus the connection between the nose and body portions includes a main pivot 18.

The inclining of the nose may be operated by any suitable mechanism whether hydraulic, electric or mechanical. The mechanism shown by way of example is of hydraulic type comprising a hydraulic ram 19 having one end mounted on a fixed pivot 20 and the other end pivoted to an arm 21, the shaft 22 of which carries arms 23, the free ends of which are pivoted at 24 to a pair of links 25 whereof the other ends are pivoted at 26 to the nose portion of the aircraft. The arms 23 and links 25 form a toggle which reaches a substantially dead-centre position at the drooping nose position of Figures 2 and 4, so that in this position the ram is relieved of load. Supply of pressure fluid to the ram turns the arm 21 and hence the arms 23 about the axis of the shaft 22 and draws the nose portion up to the normal-flight position of Figures 1 and 3.

A pair of bolts 27 are provided to lock the nose portion in the normal-flight position. Conveniently these are operated in opposite directions by a single hydraulic jack 28 arranged as shown in Figure 5. The two bolts 27 are connected through links 29 to opposite ends of the jack which are also pivoted to a pair of arms 30 and 31 pivoted at 32 and 33 respectively in a fixed base 34. The arm 31 has an extension 35 projecting beyond the pivot 33 and a link 36 is pivoted at one end to this extension at 37, and at its other end to an intermediate point 38 of the arm 30. Accordingly contraction of the jack 28 tends to withdraw both bolts but if the resistance of one exceeds that of the other there would be a tendency for only one to be withdrawn. This is prevented by the arms 30 and 31 and the link 36 which constrain both bolts to move substantially equally. Thus if there is no resistance to withdrawal of one bolt, twice the force exerted by the jack will be applied to the other bolt.

It will be noted that the main pivot 18 about which the nose portion is hinged is located some distance above the bottom of the fuselage. This enables the hinge to extend a substantial distance across the fuselage without protruding beyond it. It is rendered possible by the fact that a pair of doors 41 for the front under-carriage are arranged immediately to the rear of it. The opening of these doors allows the lowermost point 42 of the nose portion to move rearwardly into the space vacated by the doors. The doors are provided with operating mechanism indicated diagrammatically at 43 while the mechanism for retracting and projecting the undercarriage is indicated at 44. As these mechanisms may be of conventional construction they are not shown in detail and will not be described in detail. In accordance with customary practice the door-operating mechanism is interlocked with the under-carriage retracting mechanism so as to ensure that the doors are opened before the under-carriage is projected and the under-carriage is retracted before the doors are closed.

Similarly the actuating means for the nose portion are interconnected with the mechanism for operating the doors, to ensure that the nose portion will only be moved to its drooping-nose position when the doors are open. Similar inter-connection is provided between the bolts 27 and the nose-actuating means, to ensure that the bolts are withdrawn before the nose is lowered and are not projected again until the nose has been raised to its normal-flight position.

It will be appreciated that the joint between the nose portion and the body portion is arranged to be completely flush in the normal-flight position in which the aircraft will always be maintained for high-speed flight, although a discontinuity or shoulder or even an opening may be formed when the nose is lowered, as this will only occur at relatively low speed when taking off or landing.

The hinge 18 may be in the form of an explosive bolt in which a charge can be ignited to blow the head off the bolt so that the whole hinge is disconnected. Then the complete cockpit and nose portion can be provided with a parachute 46 while the cockpit may have hermetic sealing means 47 at all the joints so that in an emergency the nose portion can be lowered by parachute carrying the pilot.

In the alternative construction shown in Figure 6, in order to obviate the necessity for hinging the pilot's controls, the cockpit remains fixed and the nose portion is arranged to hinge about an axis 45 in the region of the forward lower end of the cockpit.

What I claim as my invention and desire to secure by Letters Patent is:

1. An aircraft having a fuselage formed in two portions, a body portion including a seat for the pilot and a nose portion including opaque means forward of the pilot's face limiting his field of vision in a downward direction, a transverse pivotal connection between the portions permitting the nose portion to be pivoted downward relatively to the body portion about an axis aft of the opaque means from a normal flight position to a drooping nose position, and actuating means for moving the nose portion from the normal flight position to the drooping nose position and from the drooping nose position to the normal flight position.

2. An aircraft as claimed in claim 1 including a retractable undercarriage interconnected with the actuating means for preventing movement of the nose portion when the undercarriage is not projected.

3. An aircraft as claimed in claim 2 in which the pivotal axis of the nose portion is substantially above the lowermost point of the nose portion including at least one door for the retractable undercarriage located immediately to the rear of the lowermost point of the nose portion and forming when closed an obstruction preventing the lowermost point of the nose portion from moving rearwardly and thus preventing the nose portion from pivoting downwardly.

4. An aircraft having a fuselage formed in two portions, a body portion including undercarriage means adapted to support the body portion on the ground and a nose portion including a seat for the pilot and opaque means forward of the pilot's face limiting his field of vision in a downward direction, a transverse pivotal connection between the portions permitting the nose portion to be pivoted downward relatively to the body portion from a normal flight position to a drooping nose position, and actuating means for moving the nose portion from the normal flight position to the drooping nose position and from the drooping nose position to the normal flight position.

5. An aircraft as claimed in claim 4 including a retractable undercarriage interconnected with the actuating means for preventing movement of the nose portion when the undercarriage is not projected.

6. An aircraft as claimed in claim 5 in which the pivotal axis of the nose portion is substantially above the lowermost point of the nose portion including at least one door for the retractable undercarriage located immediately to the rear of the lowermost point of the nose portion and forming when closed an obstruction preventing the lowermost point of the nose portion from moving rearwardly and thus preventing the nose portion from pivoting downwardly.

7. An aircraft as claimed in claim 4 in which the nose portion contains a hermetically sealed cockpit.

8. An aircraft as claimed in claim 7 including means for completely disconnecting the nose portion from the body portion and a parachute connected to the nose portion.

9. An aircraft having a fuselage formed in two portions, a body portion including wings for supporting substantially the whole aircraft, and a nose portion including opaque means forward of the pilot's face limiting his field of vision in a downward direction, a transverse pivotal connection between the portions permitting the nose portion to be pivoted downward relatively to the body portion from a normal flight position to a drooping nose position, and actuating means for moving the nose portion from the normal flight position to the drooping nose position and from the drooping nose position to the normal flight position.

10. An aircraft as claimed in claim 9 including a retractable undercarriage interconnected with the actuating means for preventing movement of the nose portion when the undercarriage is not projected.

11. An aircraft as claimed in claim 10 in which the pivotal axis of the nose portion is substantially above the lowermost point of the nose portion including at least one door for the retractable undercarriage located immediately to the rear of the lowermost point of the nose portion and forming when closed an obstruction preventing the lowermost point of the nose portion from moving rearwardly and thus preventing the nose portion from pivoting downwardly.

12. An aircraft as claimed in claim 9 in which the nose portion contains a hermetically sealed cockpit.

13. An aircraft as claimed in claim 12 including means for completely disconnecting the nose portion from the body portion and a parachute connected to the nose portion.

14. An aircraft having a fuselage formed in two portions, a body portion including undercarriage means for supporting the body portion on the ground and wings for supporting substantially the whole aircraft, and a nose portion including a seat for the pilot and opaque means forward of the pilot's face limiting his field of vision in a downward direction, a transverse pivotal connection between the portions permitting the nose portion to be pivoted downward relatively to the body portion from a normal flight position to a drooping nose position, and actuating means for moving the nose portion from the normal flight position to the drooping nose position and from the drooping nose position to the normal flight position.

15. An aircraft as claimed in claim 14 including a retractable undercarriage interconnected with the actuating means for preventing movement of the nose portion when the undercarriage is not projected.

16. An aircraft as claimed in claim 15 in which the pivotal axis of the nose portion is substantially above the lowermost point of the nose portion including at least one door for the retractable undercarriage located immediately to the rear of the lowermost point of the nose portion and forming when closed an obstruction preventing the lowermost point of the nose portion from moving rearwardly and thus preventing the nose portion from pivoting downwardly.

17. An aircraft as claimed in claim 14 in which the nose portion contains a hermetically sealed cockpit.

18. An aircraft as claimed in claim 17 including means for completely disconnecting the nose portion from the body portion and a parachute connected to the nose portion.

References Cited in the file of this patent

UNITED STATES PATENTS

| | | |
|---|---|---|
| 1,828,026 | Cline | Oct. 20, 1931 |
| 2,476,770 | Robert | July 19, 1949 |
| 2,487,646 | Gluhareff | Nov. 8, 1949 |
| 2,533,548 | Backer | Dec. 12, 1950 |
| 2,591,867 | Prower | Apr. 8, 1952 |

FOREIGN PATENTS

| | | |
|---|---|---|
| 51,470 | Netherlands | Nov. 15, 1941 |
| 546,588 | Great Britain | July 20, 1942 |
| 852,942 | Germany | Oct. 20, 1952 |
| 913,498 | Germany | June 14, 1954 |